US011132382B2

(12) United States Patent
Schmidt et al.

(10) Patent No.: US 11,132,382 B2
(45) Date of Patent: *Sep. 28, 2021

(54) ASYNCHRONOUS NOTIFICATIONS FOR A DATASTORE OF A DISTRIBUTED SYSTEM

(71) Applicant: Uber Technologies, Inc., San Francisco, CA (US)

(72) Inventors: Rene Wenzel Schmidt, Risskov (DK); Jakob Holdgaard Thomsen, Risskov (DK)

(73) Assignee: Uber Technologies, Inc., San Francisco, CA (US)

( * ) Notice: Subject to any disclaimer, the term of this patent is extended or adjusted under 35 U.S.C. 154(b) by 204 days.

This patent is subject to a terminal disclaimer.

(21) Appl. No.: 16/526,663

(22) Filed: Jul. 30, 2019

(65) Prior Publication Data

US 2019/0354539 A1 Nov. 21, 2019

Related U.S. Application Data

(63) Continuation of application No. 15/384,255, filed on Dec. 19, 2016, now Pat. No. 10,409,837.

(60) Provisional application No. 62/271,183, filed on Dec. 22, 2015.

(51) Int. Cl.
*G06F 16/27* (2019.01)
*G06F 16/22* (2019.01)
*G06F 16/23* (2019.01)

(52) U.S. Cl.
CPC ........ *G06F 16/273* (2019.01); *G06F 16/2282* (2019.01); *G06F 16/2379* (2019.01)

(58) Field of Classification Search
USPC .......................................... 707/615
See application file for complete search history.

(56) References Cited

U.S. PATENT DOCUMENTS

| 6,401,099 B1* | 6/2002 | Koppolu ............. G06F 9/543 |
| 6,910,070 B1 | 6/2005 | Mishra et al. |
| 7,448,039 B2* | 11/2008 | Green ............. G06F 11/3476 |
| | | 719/310 |
| 7,552,443 B2* | 6/2009 | Upton ............. G06F 9/541 |
| | | 707/999.102 |
| 8,015,572 B2* | 9/2011 | Marvin ............. G06F 9/465 |
| | | 719/320 |

(Continued)

OTHER PUBLICATIONS

United States Preinterview First Office Action, U.S. Appl. No. 15/384,255, dated Feb. 7, 2019, four pages.

*Primary Examiner* — Cam Linh T Nguyen
(74) *Attorney, Agent, or Firm* — Fenwick & West LLP

(57) ABSTRACT

The data of an online system is distributed over a number of different physical servers and databases on those servers. The online system shards the data to increase system scalability and replicates the shards to increase data reliability. Features such as sharding and replication in turn increase data storage system complexity. Accordingly, in order to provide simplified data storage semantics to applications that use the online system, the online system provides access to data via asynchronous callback functions that are triggered once data has been written and is available for reading by client code. Thus, applications need only specify code to be used in response to data write events, and can thereafter interact with the online system data using a data-driven paradigm.

15 Claims, 6 Drawing Sheets

(56) References Cited

U.S. PATENT DOCUMENTS

| | | | |
|---|---|---|---|
| 8,806,041 B1 * | 8/2014 | Lopez Suarez | H04L 63/102 |
| | | | 709/229 |
| 9,503,501 B2 * | 11/2016 | Toussaint | H04L 67/02 |
| 9,552,599 B1 * | 1/2017 | Alag | H04L 65/1063 |
| 10,185,632 B2 | 1/2019 | Lee et al. | |
| 2002/0126621 A1 | 9/2002 | Johnson et al. | |
| 2005/0183092 A1 | 8/2005 | Christensen et al. | |
| 2008/0183378 A1 | 7/2008 | Weidner | |
| 2010/0070982 A1 | 3/2010 | Pitts | |
| 2013/0047255 A1 | 2/2013 | Dalcher | |

* cited by examiner

ASYNCHRONOUS NOTIFICATIONS FOR A DATASTORE OF A DISTRIBUTED SYSTEM

RELATED APPLICATIONS

This application is a continuation of U.S. patent application Ser. No. 15/384,255, which claims the benefit of Provisional Application No. 62/271,183, filed on Dec. 22, 2015, both of which are incorporated herein by reference.

FIELD OF ART

The present disclosure generally relates to the field of Internet-distributed data storage, and more specifically, to providing asynchronous callback functionality hiding distributed data consistency issues to applications that use the data storage.

BACKGROUND

Internet-based distributed application systems require data storage systems that are more complex than those of non-distributed systems. Desirable properties of such storage systems include scalability (the ability to increase aggregate storage capacity by adding new storage units without system redesigns), data replication (multiple distributed copies of the same data, in order to prevent data loss upon failure of a particular storage system unit), write availability (applications not being prevented from writing to the storage due to hardware failures or to competition writes from other applications), fast update/query times, and simplicity of use for applications using the data storage.

It is difficult for distributed storage systems to simultaneously achieve all of these objectives. As one example, the increasing complexity of the data storage infrastructure and algorithms needed to achieve properties such as scalability, data replication, write availability, and fast read/query times tend to render use of the data storage more difficult for application code, which may need to be aware of complexities such as handling different types of error conditions.

SUMMARY

The data of an online system is distributed over a number of different physical servers and databases on those servers. The online system shards the data to increase system scalability and replicates the shards to increase data reliability. Features such as sharding and replication in turn increase data storage system complexity. Accordingly, in order to provide simplified data storage semantics to applications that use the online system, the online system provides access to data via asynchronous callback functions that are triggered once data has been written and is available for reading by client code. Thus, applications need only specify code to be used in response to data write events, and can thereafter interact with the online system data using a data-driven paradigm.

Additionally, processing by the asynchronous callback functions may be restarted at earlier points without resulting in inconsistent data, thereby providing considerable fault-tolerance. This is achieved by attributes of the online system such as the use of an append-only data store, the tracking of a unique offset position within a shard, the retaining of cell order across data servers when the cells are replicated, and the tracking by the applications of their positions in processing given shards.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments for purposes of illustration only. One skilled in the art will readily recognize from the following description that alternative embodiments of the structures and methods illustrated herein may be employed without departing from the examples described herein.

DETAILED DESCRIPTION

Figure 1:
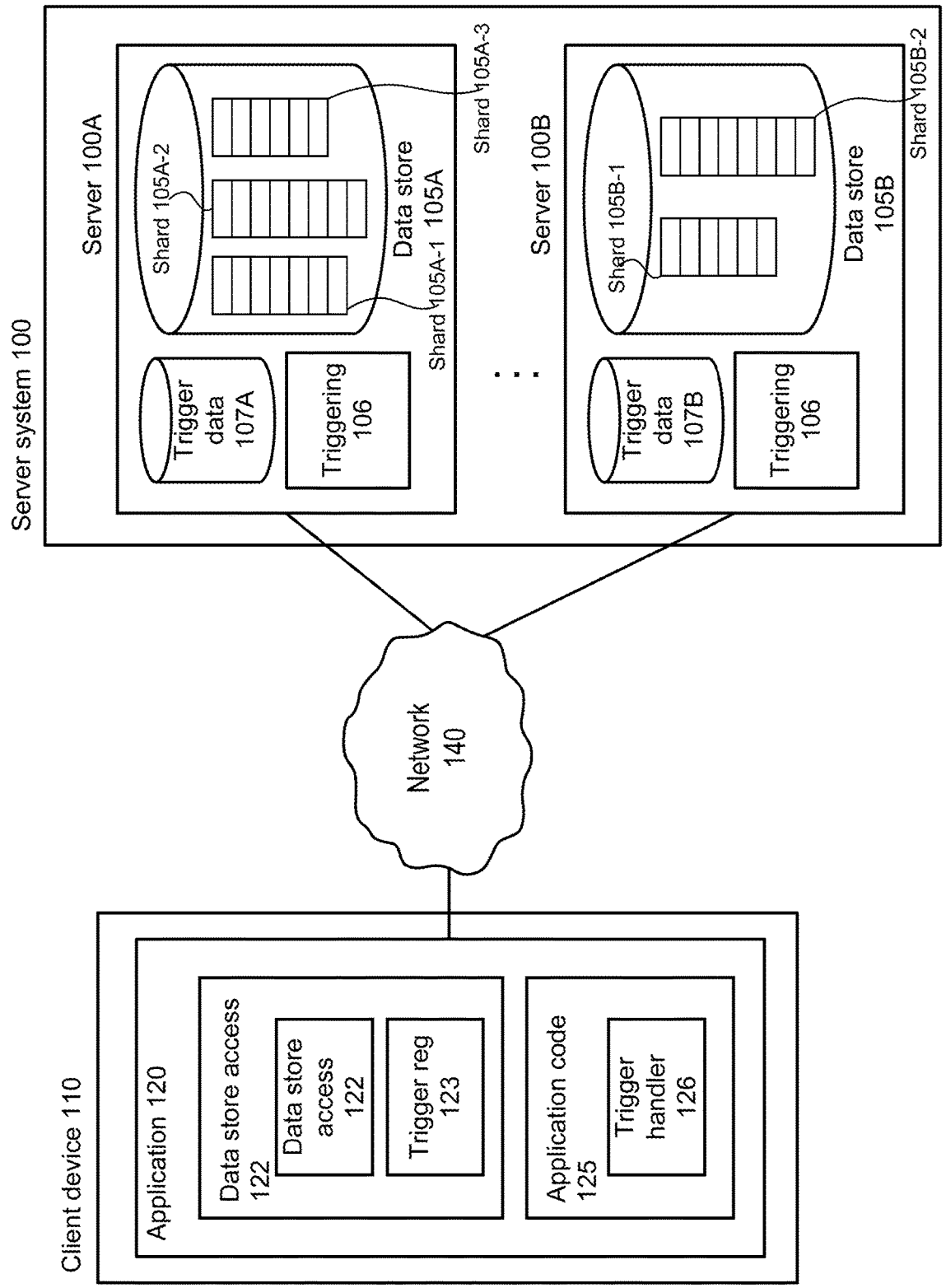
FIG. 1 illustrates a detailed view of a distributed data storage environment in which servers provide data storage functionality to applications via a network, according to one embodiment.

FIG. 1 illustrates a detailed view of a distributed data storage environment in which a server system 100 comprising various servers provides data storage functionality to applications via network 140, according to one embodiment. The applications may run on one or more of the servers 100 themselves, or (as illustrated in FIG. 1) they may run on client devices 110 other than the servers 100. The example of the environment depicted in FIG. 1 can correspond to or be part of a service arrangement system, for example, in which the various applications perform actions such as logging the details of a service (e.g., a transport or delivery service, referred to herein as a "trip"), accepting payment at the conclusion of a trip, performing analytics, and the like.

The client device 110 can correspond to a computing device, such as a smart phone, tablet computer, or any other device that can make calls over the network 140 to the servers 100. There may be any numbers of client devices 110 storing and running applications 120 in communication with the servers 100 and their respective data stores 105, either simultaneously or at different times. For example, two different applications 120 (or different instances of the same application 120) could simultaneously write to the same portion of a data store 105 (e.g., to the same column, as described later). A given application 120 (e.g., an application/service that updates a data store to log information about a trip in the UBER network) may execute on only a single client device 110, or on multiple client devices (e.g., with each client device 110 running one instance of the application 120).

The network 140 may be any suitable communications network for data transmission. In an embodiment such as that illustrated in FIG. 1, the network 140 uses standard communications technologies and/or protocols and can include the Internet. In another embodiment, the entities use custom and/or dedicated data communications technologies.

Data Storage Architecture

The set of servers 100 includes some number of individual servers, such as (but not limited to) the servers 100A and 100B illustrated in FIG. 1, which collectively provide a distributed data store 105 via the aggregation or collection of the individual data stores 105 stored on the individual servers 100. Applications use a data store access module 122, which provides an application programming interface (API) for the distributed data store 105.

The data of the distributed data store 105 is represented by the API of the data store access module 122 as discrete "cells" of data, with each cell being addressed in terms of a row, a column, and a reference key. Referring to the example of a network service, such as one implemented by the service arrangement system, as one specific example, a particular application could use the row to indicate a particular person (e.g., a particular passenger or user of a service, such as a delivery or transport service), the column to indicate a particular category of data associated with the person (e.g., basic trip information for the passenger, such as an ID of the driver, the trip's time of day, and the like, or the status of a trip for the passenger, such as whether the trip has been billed yet), and the reference key to represent a particular unit/version of information within the given row and column.

In one embodiment, the API of the data store access module 122 includes at least the append-only write function put_cell(row_key, column_key, ref_key, data), which stores the value "data" as the value for the cell represented by the values row_key, column_key, and ref_key. In this embodiment, the cells are immutable, so the write function, when applied to a given cell, appends a new value of the cell, rather than overwriting an existing value of the cell. In this embodiment, the API also includes the random access read functions get_cell(row_key, column_key, ref_key), which gets a particular sub-value/version of a cell (as indicated by ref_key), and get_cell(row_key, column_key), which gets the most-recently-appended version of the cell. In some embodiments, the API of the data store access module 122 additionally and/or alternatively includes other functions, such as get_cells_for_shard(shardID, afterValue, limit) that gets the cells after a given offset within a shard (determined by the parameter "afterValue", e.g., as specified by "added_id" or "created_at" from Table 1, below); the optional limit parameter may be used to limit how many cells are obtained. The "get_cells_for_shard" function supports triggering, as described later below.

Note that although the terms "row" and "column" are employed, the above-described data store architecture differs from that of a traditional relational database, in that there is no specific schema (columns and their types) imposed upon all applications that use the data store. Rather, although each application uses the general row/column/reference key addressing scheme to reference individual cells of data, the application uses its own application-defined schema for the data stored in a particular cell. For example, in one embodiment, the value of each cell is a JavaScript Object Notation (JSON) blob of data that has no particular meaning to the distributed data store 105 itself, but has meaning for the individual applications that read and write that data. In one embodiment, a cell's general structure is represented with the database schema of Table 1, below (although as noted the meaning of the "body" is application-defined):

TABLE 1

| NAME | TYPE |
| --- | --- |
| added_id | int, auto-increment |
| row_key | UUID |
| column_name | String |
| ref_key | Int |
| Body | Blob |
| created_at | Datetime |

The "added_id" auto-increment column of the schema provides a unique pointer to each cell. The uniqueness of the pointers means that appended cells created as a result of cell writes represent a "total order" (linearly ordered set) within a given shard.

In one embodiment, the distributed data store 105 is sharded, so as to achieve the property of scalability, with replication of the shards on one or more of the other servers 100, so as to achieve the property of reliability.

In one embodiment, the distributed data store 105 is further sub-divided into a set of separate sub-data stores, each indicated by its own name (e.g., a name of "string" data type). In this embodiment, the full set of parameters for specifying a cell of data is the sub-data store name in combination with a row, column, and ref_key for that sub-data store.

Figure 2:
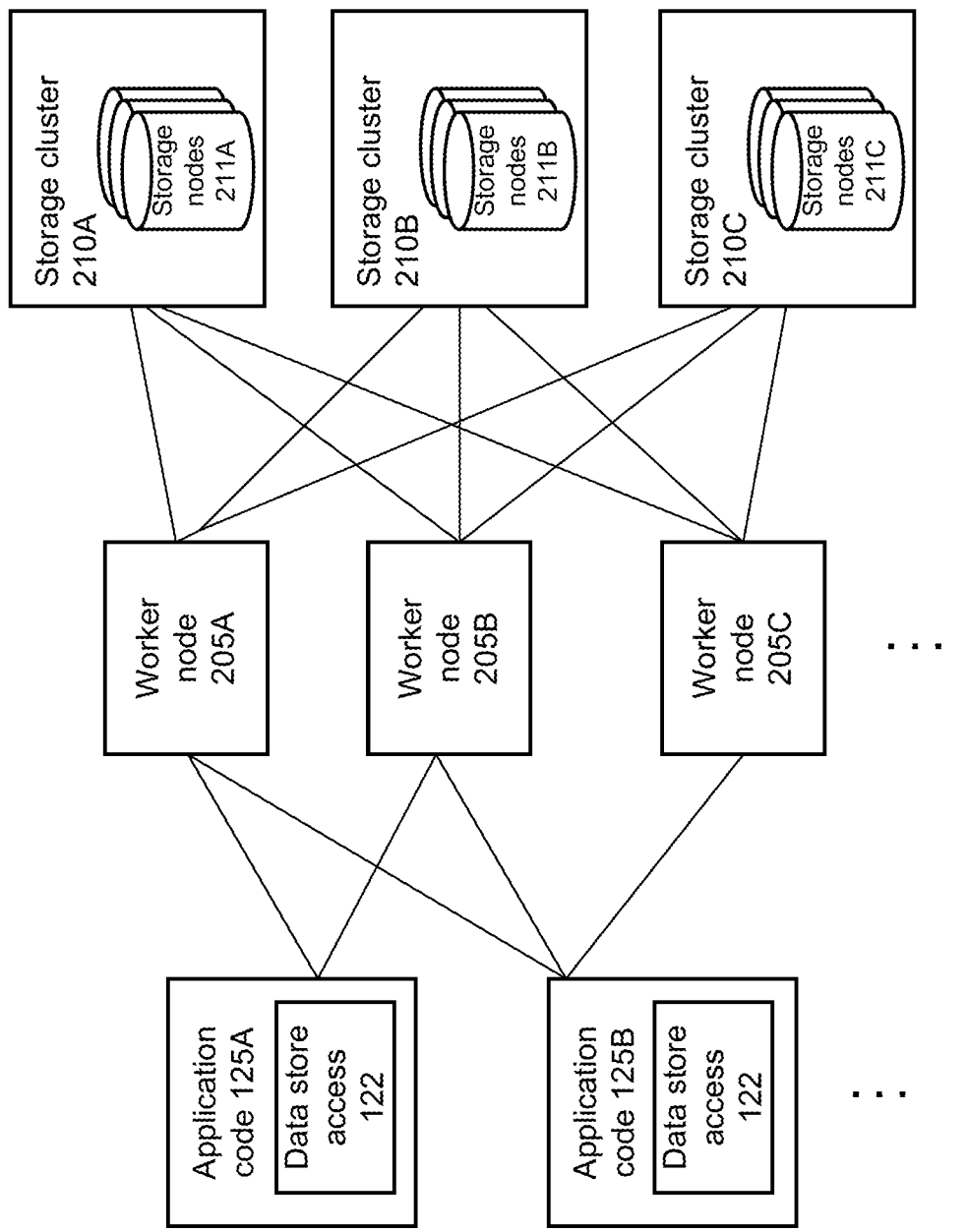
FIG. 2 illustrates the partitioning of the distributed data storage environment of FIG. 1 into worker nodes and storage nodes, according to one embodiment.

In one embodiment, depicted in FIG. 2, the operations and data of the distributed data storage environment of FIG. 1 are partitioned into a set of worker nodes 205 and storage nodes 211. Depending on implementation, the worker nodes 205 and storage nodes 211 may be located on the same physical or virtual hosts (e.g., servers) or on different physical or virtual hosts. In one embodiment, the different applications 125 communicate using their data store access modules 122 with the worker nodes 205 via a remote procedure call (RPC) mechanism, such as Hypertext Transfer Protocol (HTTP) endpoints. The worker nodes 205 route application requests (API calls of the data store access module 122 (e.g., cell write requests)) to the appropriate storage nodes, aggregate results as needed, and handle background jobs. If a particular worker node 205 fails, the data store access module 122 transparently retries the failed request on a worker node 205 of another host. In order to replicate shards, each shard is stored on one of the storage nodes 211 and replicated on one or more of the other storage nodes 211 on different servers 100, the set of the original shard and its replicas forming a logical storage cluster 210. Each logical storage cluster 210 has one master storage node; the remainder of the storage nodes are considered slave storage nodes.

In one embodiment, worker nodes 205 by default direct read requests for a cell to the master storage node of the relevant storage cluster 210 corresponding to the cell address (row key, column key, reference key), or to any of the slave storage nodes of that storage cluster. In one example, in contrast to read requests, worker nodes 205 can direct write requests for a cell only to the master storage node for the cell's storage cluster 210, asynchronously replicating the write to the slave storage nodes.

Figure 3:
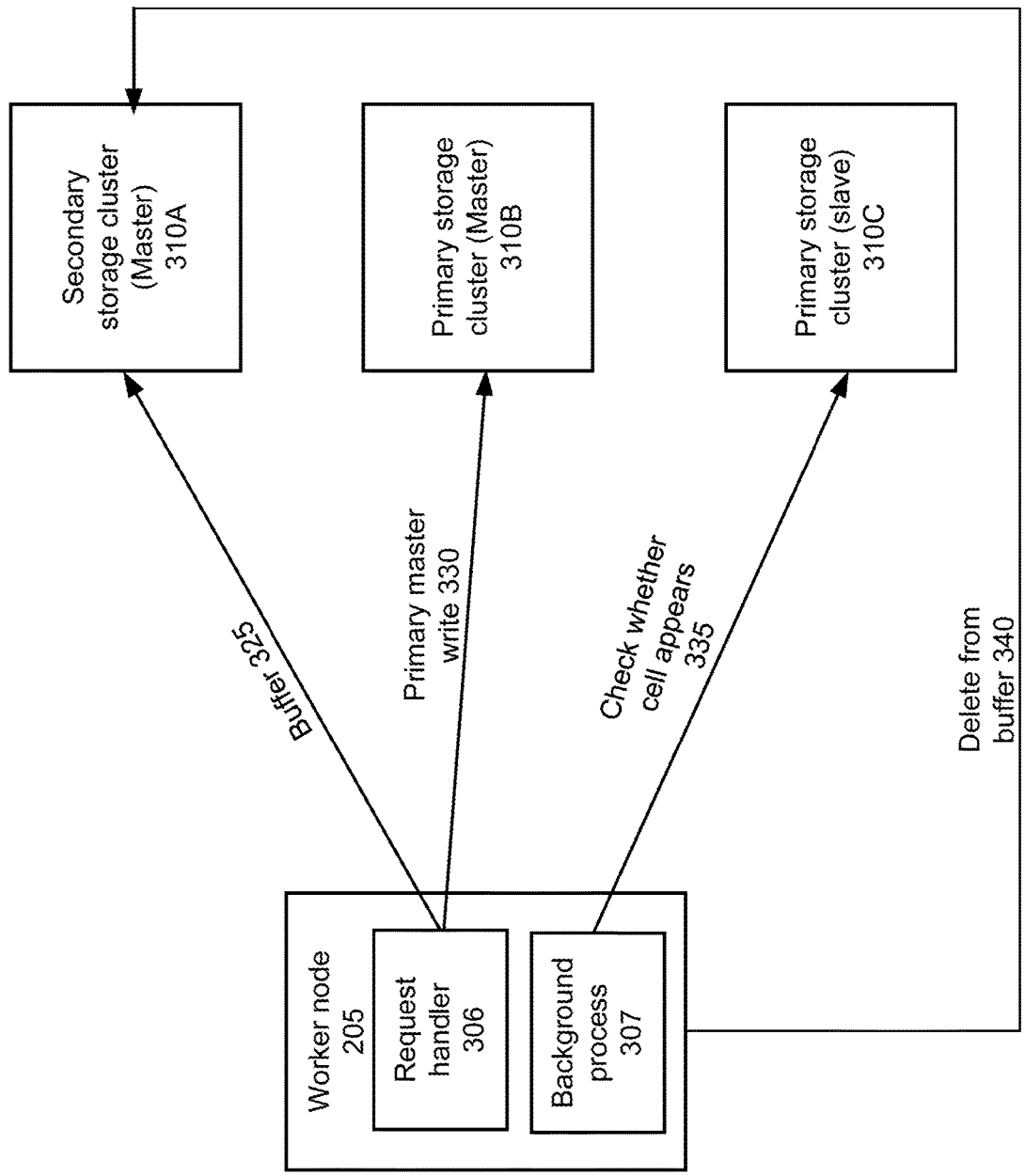
FIG. 3 illustrates the use of buffered writes to achieve asynchronous replication of data, according to one embodiment.

In one embodiment, the asynchronous replication is achieved via buffered writes, as is illustrated in FIG. 3. Using the buffered writes technique, a request handler 306 of the worker node 205 handling the write request first chooses (e.g., randomly or alternatively, in a predefined manner) the master storage node 310A of a secondary cluster different from the primary cluster to which the write is destined, and buffers 325 the cell value of the write in a buffer table of that master storage node 310A. The request handler 306 then writes 330 to the master storage node of the primary cluster 310B to which the write is destined. The write request is not considered to have succeeded unless both the buffering write 325 and the write 330 to the primary master are successful. Separately, a background process 307 of the worker node 205 monitors whether the written cell has appeared on the slave storage nodes 211 of the primary storage cluster 310C, as occurs asynchronously after the worker node 205 asynchronously replicates the data written to the master storage node of the primary cluster 310B to the slave storage nodes. Once the background process 307 determines that the cell value has been replicated to the slave storage nodes, it deletes 340 the cell value from the buffer table of the master storage node 310A. The use of buffered writes minimizes the possibility of the master storage node of the primary cluster 310B failing before the asynchronous replication has propagated the cell write value to the slave storage nodes of the primary cluster 310C. Idempotency of writes is achieved by the storage nodes 211 rejecting a write to the same address (row, column, reference key) previously written to.

In one embodiment, a relational database management system, such as MYSQL, is used to implement the various storage nodes 211, with each shard being allocated its own database.

Triggering Architecture for Asynchronous Callbacks

The replication of data to slave nodes 211 of a storage cluster 210A, which is employed to minimize data loss, increases the complexity of the storage system. As a result, in some examples, applications 120 using this system would need to account for anomalous conditions that might take place as a result of the complexity. For example, an application 120 that makes a cell write request cannot be guaranteed that a read request for the same cell will provide the same value that was written, since the master storage node of the storage cluster 210 to which the cell was written may have failed, and the value of the cell may not yet have been asynchronously propagated to the slave storage nodes in the storage cluster 210. Accordingly, the application 120 would need to include code that polls for success of the write request, or otherwise accounts for the fact that the "read your own write" property may not apply. This need to account for anomalous conditions results in less intuitive programming semantics for data storage.

Returning to FIG. 1, to address this problem, the distributed data storage environment includes a triggering framework that provides applications 120 with the ability to register asynchronous callback functions-hereinafter referred to as "trigger functions"—that the triggering framework will cause to execute when a cell has been completely written and is available for reading. This allows a data-driven programming style for applications that use distributed data, which is particularly useful in the case of sets of related applications, or different portions of functionality of a single application, that are organized primarily based on their relationships to different events within a data flow.

For example, referring again to the example of service arrangement systems, one division of system functionality is for a first application 120/service of the system to be responsible for logging a passenger's trip (e.g., storing location data and/or timestamps associated with the route of the trip, including a start location and end location), and for a second application 120/service to be responsible for billing the passenger for the trip once it has completed, which is a conceptually different task. In one example implementation, basic information about the trip—including the time of the trip, the logged geographic coordinates the trip, etc.—is stored in a column named "BASIC_INFO", and financial information related to payment for the trip is stored in a column named "STATUS." The use of trigger functions allows the second application 120/service to act in response to specific data events, such as writes to the "BASIC_INFO" column that may signal that a trip was completed and hence is ready for billing. This effects an improvement in the functionality of the distributed data storage environment by freeing the second application 120/service from the burden of monitoring the state of the distributed data store to determine whether any trips are ready for payment processing—a determination that could be quite difficult to ascertain with certainty when the design of the distributed data store 105 is complex.

According to an example, the triggering framework includes a trigger registration API 123, trigger handler code 126, trigger data 107, and triggering modules 106. The application 120 includes trigger handler code 126 created by the application designer to carry out the functionality of the application by interacting with the data of the distributed data store 105. The application code 125 of the application 120 uses a trigger registration API 123 provided by the data store access module 122 to register the trigger handler with the servers 100. In response to a call of the application code 125 to the trigger registration API, the servers 100 store the trigger handler code 126 in trigger data stores 107, which record all the active triggers that may potentially be executed in response to data writes. Triggering modules 106 on the servers 100 then issue a call to the trigger handler code 126 stored in the trigger data stores 107 when a cell write occurs that causes corresponding triggers to be activated.

In one embodiment, the trigger registration API 123 includes a method that takes as parameters at least (a) an indication of the trigger handler code 126 to be run in response to a cell write, and/or (b) an indication of the particular types of cell writes that will cause the trigger handler code 126 to be executed. In some embodiments step (b) is provided by specifying the name of one or more columns, where writes to any cell in the column(s) will trigger the corresponding trigger handler code; in other embodiments, step (b) is additionally and/or alternatively provided by specifying the row and/or ref_key in combination with the column. As further examples, step (a) could be provided by a function pointer to statically-compiled code, or by specification of a code block. As an example of the former, the trigger registration API 123 might include a function, voidRegisterTrigger(void*, string), that takes a pointer to the code for the trigger registration function 123 as the first argument, and a textual name(s) for the column(s) as the second argument. As an example of the latter, in a programming language such as PYTHON that provides function decorator functionality, the trigger registration API 123 might include a decorator function, trigger, that wraps given trigger handler code 126 by registering the trigger code with the servers 100. For instance, Listing 1 is an excerpt from possible application code 125 specified in PYTHON:

Listing 1

```
diststorage_instance = diststorage(datastore='trip_storage')
@trigger(column='BASIC_INFO')
def bill_rider(row_key):
    status = diststorage_instance.get_cell_latest(row_key, 'STATUS')
    if status.is_completed:#I.e., the customer was already billed
        return
    #Otherwise, bill the customer now:
    # Fetch the base trip information from the BASIC_INFO
      column
        trip_info =
    diststorage_instance.get_cell_latest(row_key,
    'BASIC_INFO')
        # We bill the rider
        result =
    call_to_credit_card_processor_for_billing_trip(trip_info)
        if result != 'SUCCESS':
            # Raise an exception to let triggers retry later
            raise CouldNotBillRider( )
        # We billed the rider successfully and write it back
        diststorage_instance.put(row_key, status,
            body={'is_completed': True, 'result': result})
    ...
```

The first line's call to the diststorage( ) function obtains an independent instance of the distributed storage environment for use by the application 120. The second line calls the trigger decorator function, which wraps the bill_rider( ) function that follows by registering it within the trigger data 107, along with the column descriptor string 'BASIC_INFO'. In consequence, the code of the bill_rider( ) function will be called by the triggering modules 106 whenever they detect that the 'BASIC_INFO' column has been written within the distributed data store 105. The code of the bill_rider( ) function itself takes the row (e.g., customer ID) as an argument, then performs a read of the 'STATUS' column for that same row (using the get_cell_latest( ) function to obtain the latest version of the corresponding cell) to determine whether the customer corresponding to that row has already been billed for the trip. If so, it exits; if not, it proceeds to attempt to bill the customer.

Processing Triggers

The triggering framework creates a separate storage instance environment for each application 120 that uses a data store within the distributed data store 105. (For example, the application 120 having the code of Listing 1 above obtains a storage instance environment for its own use by calling the diststorage( ) function with the argument 'trip_storage', specifying the 'trip_storage' data store.) In one embodiment, the triggering framework maintains two tables of trigger metadata: a trigger offset table and a trigger error table.

The trigger offset table is used by an application 120 to update how far it has proceeded in processing cells. This means that for a given application 120, the trigger offset table records, for every shard, what sub-data store it is fetching cells from, its consumer ID, and its offset. The offset represents the added_id value (see Table 1) up to which it has processed cells within the shard. The triggering module 106 causes the registered trigger handlers to process cells in the order that the cells were written, i.e., in the order of cells' added_id; thus, the "offset" value represents the last-written cell that has been processed.

In one embodiment, the trigger offset table includes the data of Table 2, below:

TABLE 2

| NAME | TYPE |
|---|---|
| shard | Int |
| datastore | String |
| consumer | String |
| offset | Int |

The trigger error table stores metadata tracking previous trigger handlers 126 that were not able to be processed. As one example of failure, a trigger handler 126 might fail to be processed, for example, if it makes an external network call that fails. In one embodiment, trigger handlers 126 that encounter difficulties in processing can throw an exception of a type known to the trigger module 106, causing the trigger module to place metadata about the trigger handler in the trigger error table.

In one embodiment, the trigger error table includes the data of Table 3, below:

TABLE 3

| NAME | TYPE |
|---|---|
| Shard | Int |
| row_key | UUID |
| datastore | String |
| consumer | String |
| Msg | String |
| Status | String |

The trigger module 106 can process the data in the trigger error table to attempt to resolve the errors.

In one embodiment, the rows of the trigger offset table and the trigger error table are sharded based on their "shard" column, and thus are stored along with the same shards to which they correspond.

Although the trigger offset and trigger error information in depictured as being stored in summary tables in the embodiment described above, in other embodiments the trigger offset and trigger error information may be stored in other manners, such as consistent storage options such as a centralized configuration service (e.g., APACHE ZOO-KEEPER), or transient storage options such as an in-memory data store (e.g., REDIS).

Figure 4:
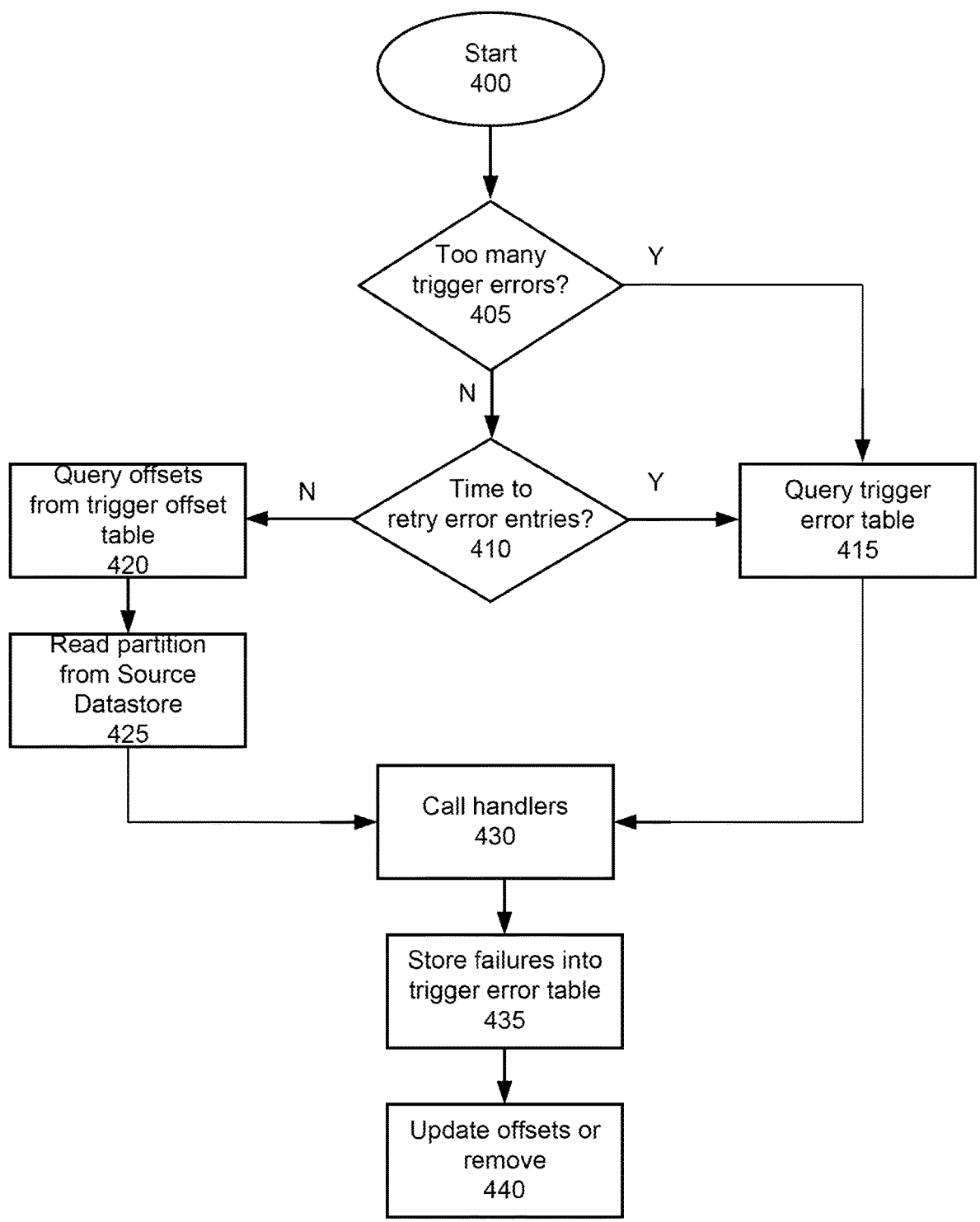
FIG. 4 is a flowchart illustrating the process of handling a trigger event for a partition, according to one embodiment.

FIG. 4 is a flowchart illustrating the process of handling a trigger event for a partition, according to one embodiment.

The trigger module 106 determines, in a first test 405, whether there are too many trigger errors already stored in the trigger error table; if so, this indicates a systemic error (e.g., incorrect code leading to frequent trigger handler errors) that should be addressed before proceeding with further trigger handler processing; if not, then the trigger module 106 proceeds to determine 410 whether it is time to retry prior failed trigger handlers. In one embodiment, the trigger module 106 tracks the times at which trigger handlers are tried and retried, so as to retry the trigger handlers only periodically (e.g., at 5 minute intervals initially, and then less frequently according to exponential backoff). If it is time to retry prior failed trigger handlers, the trigger module 106 proceeds to state 415, in which it queries the trigger error table to identify failed trigger handlers; otherwise, it proceeds to query 420 offsets of the trigger handlers triggered by the last cell write operation and to read 425 the corresponding cell data (i.e., the cells with added_id values above the offsets from step 420). In one embodiment, the query of step 425 is accomplished with the get_cells_for_shard function described above. With the trigger handlers to be executed identified—either the failed trigger handlers identified at step 415 from data in the trigger error table, or the trigger handlers triggered by the latest cell write as determined in steps 420 and 425—the trigger module 106 then calls 430 those trigger handlers. If execution of the handlers leads to failures, the trigger module 106 stores 435 the failures into the trigger error table 435; if the execution is successful, the trigger module 106 either updates the offsets (i.e., sets the offset values to that of the last-written cell successfully processed by the trigger handler) or else removes the (now successful) trigger handler entries from the trigger errors table as an indication that the triggers no longer need to be resolved.

Note that processing by the trigger handler functions may be restarted at earlier points without resulting in inconsistent data. This may be useful when, for example, it is determined that code for a particular trigger handler has errors and thus has been improperly processing data. The ability to restart the process (with rewritten trigger handler code) is achieved by attributes of the online system such as the use of an append-only data store, the tracking of a unique offset position within a shard using the trigger offset table, the retaining of cell order across data servers when the cells are replicated, and the tracking by the applications of their positions in processing given shards. For example, the append-only data store means that the original data cell values are not changed by the prior trigger handler processing, but rather (at most) appended to. The tracking of a unique offset position within a shard using the trigger offset table means that to "undo" prior trigger actions when restarting the trigger processing at an earlier point, the trigger offset table need merely be updated to reflect an earlier shard at which to start, and then the worker nodes 205 when restarted will begin at the shard indicated by the updated offset table. The retaining of cell order across data servers (e.g., as part of replication) means that every independent copy of the cells reflects the same temporal order of the cell writes. Finally, the tracking by the applications of their positions in shard processing means that the servers 100 need not track application state; rather, the applications are free to process cells from any point.

Figure 5:
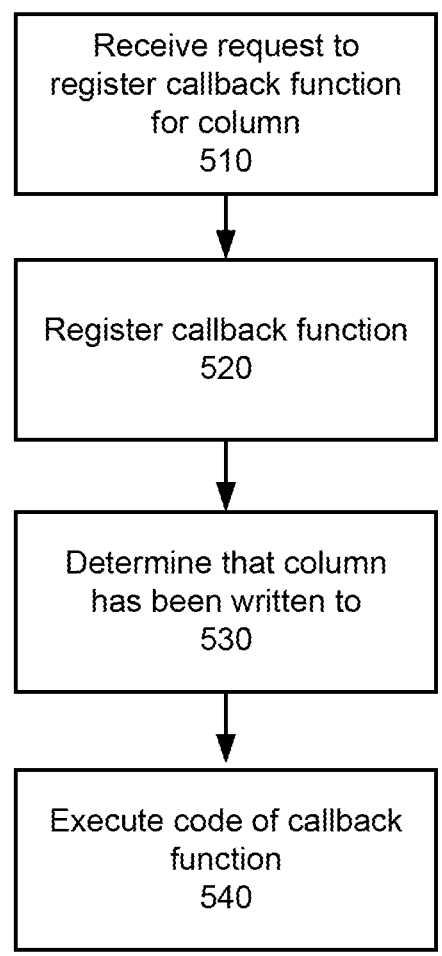
FIG. 5 is a flowchart illustrating operations of the server system of FIG. 1 when supporting data-driven interaction with data, according to one embodiment.

FIG. 5 is a flowchart illustrating operations of the server system 100 when supporting data-driven interaction with data, according to one embodiment.

The server system receives 510, from an instance of an application executing on a client device, a request to register an asynchronous callback function specifying a column of a database and including code to be executed upon writes to the column of the database. As one specific example, a particular application on the client device 110 of a driver of a vehicle transporting a rider could execute the code of Listing 1, above, which causes the function bill_rider( ) to be registered via the previously-defined decorator function, @trigger( ).

The server system 100 accordingly registers 520 the asynchronous callback function. Continuing the example, the @trigger( ) function would cause the bill_rider( ) function to be registered in the trigger data 107A.

At some later point, the server system 100 determines 530 that the column of the database has been written to. Continuing the example, the application on the client device 110 of a driver of a vehicle transporting a rider could detect completion of a trip (e.g., arriving at the destination location) and accordingly write a value for a cell of information to a particular column of the database (e.g., the BASIC_INFO table of Listing 1, above), such as a cell of data about the trip. Accordingly, as described above with respect to FIGS. 2 and 3, a worker node 205A would write the cell value to the master storage node of the primary storage cluster for the cell and cause asynchronous replication of the cell value to slave storage nodes of the primary storage cluster using buffered writes. A background process determines that the column of the database has been written to when it determines that all the slave nodes of the primary storage cluster have been updated with the written cell value.

The server system 100 executes 540 the code of the registered asynchronous callback function in response to the determination that the column has been written to. Continuing the example, the background process calls the registered bill_rider( ) function of Listing 1. Since the bill_rider( ) function reads the BASIC_INFO column (by getting its latest cell value), it is appropriate for the bill_rider( ) function not to be executed until the write to the BASIC_INFO column has been determined to be complete; otherwise, the read could obtain a value before the write is complete, resulting in erroneous data.

Figure 6:
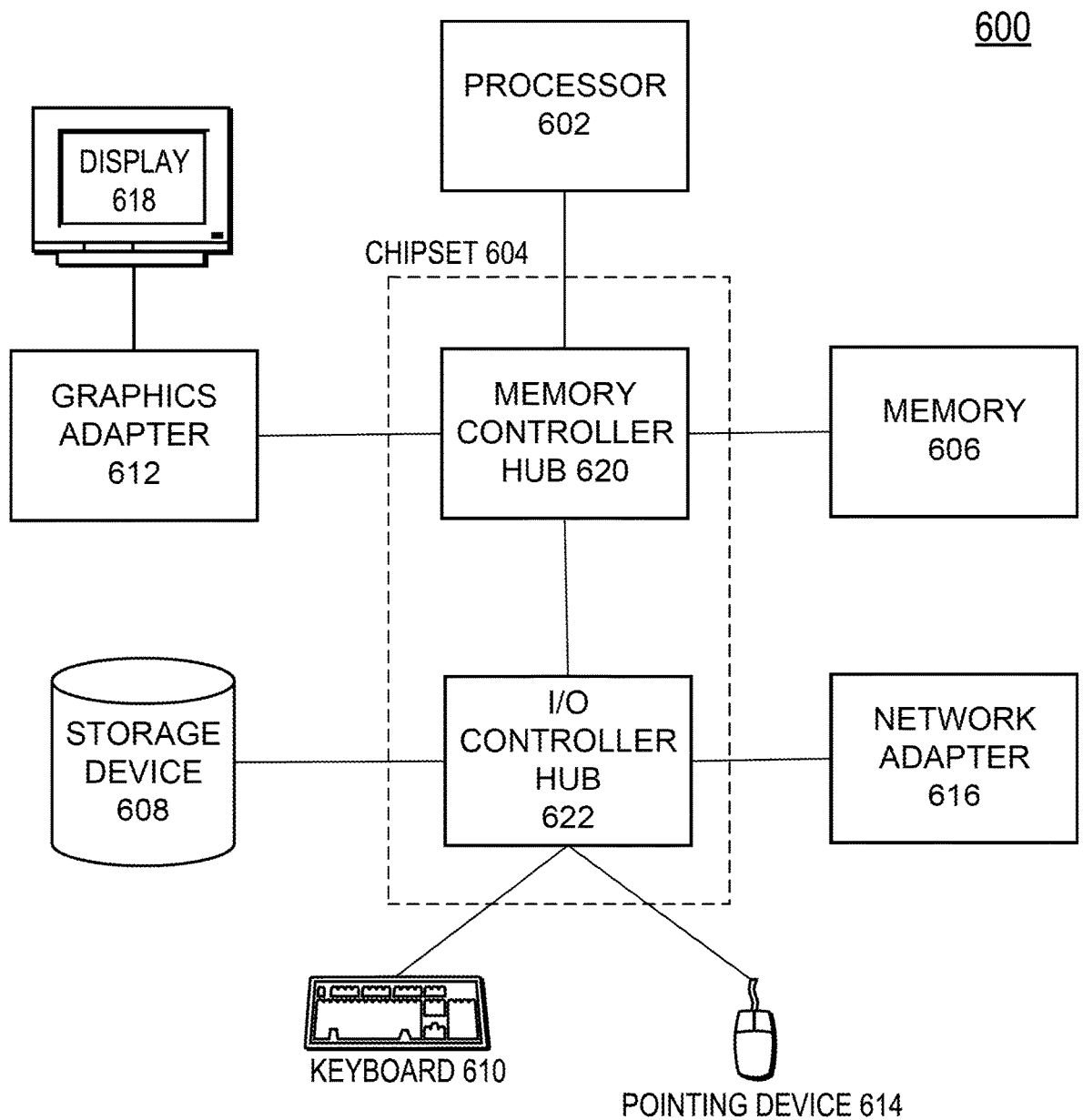
FIG. 6 is a high-level block diagram illustrating physical components of a computer used as part or all of the servers or client device from FIG. 1, according to one embodiment.

FIG. 6 is a high-level block diagram illustrating physical components of a computer 600 used as part or all of the servers 100 or client device 110 from FIG. 1, according to one embodiment. Illustrated are at least one processor 602 coupled to a chipset 604. Also coupled to the chipset 604 are a memory 606, a storage device 608, a graphics adapter 612, and a network adapter 616. A display 618 is coupled to the graphics adapter 612. In one embodiment, the functionality of the chipset 604 is provided by a memory controller hub 620 and an I/O controller hub 622. In another embodiment, the memory 606 is coupled directly to the processor 602 instead of the chipset 604.

The storage device 608 is any non-transitory computer-readable storage medium, such as a hard drive, compact disk read-only memory (CD-ROM), DVD, or a solid-state memory device. The memory 606 holds instructions and data used by the processor 602. The graphics adapter 612 displays images and other information on the display 618. The network adapter 616 couples the computer 600 to a local or wide area network.

As is known in the art, a computer 600 can have different and/or other components than those shown in FIG. 6. In addition, the computer 600 can lack certain illustrated components. In one embodiment, a computer 600 such as a server or smartphone may lack a graphics adapter 612, and/or display 618, as well as a keyboard or pointing device. Moreover, the storage device 608 can be local and/or remote from the computer 600 (such as embodied within a storage area network (SAN)).

As is known in the art, the computer 600 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 608, loaded into the memory 606, and executed by the processor 602.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method performed by a server system comprising a plurality of distributed servers, the computer-implemented method comprising:
    for each of a plurality of instances corresponding to a plurality of different applications executing on client devices:
        receiving, from the instance, a request to register an asynchronous callback function specifying a column of a database distributed across the plurality of distributed servers and including code to be executed upon writes to the column of the database, wherein each application writing to a cell of the database uses its own schema for data stored in the cell;
        registering the asynchronous callback function in association with the column of the database;
        determining that the column of the database has been written to; and
        responsive to determining that the column has been written to, executing the code of the registered asynchronous callback function.

2. The computer-implemented method of claim 1, wherein the database column is written to, for each of the plurality of applications, using a write function having parameters including row key, column key, and ref key specifying a cell, and a parameter value specifying a value for the cell.

3. The computer-implemented method of claim 2, wherein the write function is append-only, such that the value is appended to the cell without changing existing values of the cell.

4. The computer-implemented method of claim 2, wherein an instance of a first application uses a first schema for a write to a cell of the database, and an instance of a second application uses a second schema for a write to a cell of the database, the first schema being different from the second schema.

5. The computer-implemented method of claim 1, wherein the server system defines a trigger handler registration API defining a registration function for registering the asynchronous callback function, the registration function being a decorator function wrapping the asynchronous callback function.

6. A non-transitory computer-readable storage medium storing instructions that when executed by a computer processor perform actions comprising:
    receiving, from an instance of an application executing on a client device, a request to register an asynchronous callback function specifying a column of a database distributed across a plurality of distributed servers and including code to be executed upon writes to the column of the database, wherein each application writing to a cell of the database uses its own schema for the data stored in the cell;
registering the asynchronous callback function in association with the column of the database;
determining that the column of the database has been written to; and
responsive to determining that the column has been written to, executing the code of the registered asynchronous callback function.

7. The non-transitory computer-readable storage medium of claim 6, wherein the database column is written to, for each of the plurality of applications, using a write function having parameters including row key, column key, and ref key specifying a cell, and a parameter value specifying a value for the cell.

8. The non-transitory computer-readable storage medium of claim 7, wherein the write function is append-only, such that the value is appended to the cell without changing existing values of the cell.

9. The non-transitory computer-readable storage medium of claim 7, wherein an instance of a first application uses a first schema for a write to a cell of the database, and an instance of a second application uses a second schema for a write to a cell of the database, the first schema being different from the second schema.

10. The non-transitory computer-readable storage medium of claim 6, wherein the server system defines a trigger handler registration API defining a registration function for registering the asynchronous callback function, the registration function being a decorator function wrapping the asynchronous callback function.

11. A server system comprising a plurality of distributed servers, each server system comprising:
a computer processor; and
a non-transitory computer-readable storage medium storing instructions that when executed by the computer processor perform actions comprising:
receiving, from an instance of an application executing on a client device, a request to register an asynchronous callback function specifying a column of a database distributed across the plurality of distributed servers and including code to be executed upon writes to the column of the database, wherein each application writing to a cell of the database uses its own schema for the data stored in the cell;
registering the asynchronous callback function in association with the column of the database;
determining that the column of the database has been written to; and
responsive to determining that the column has been written to, executing the code of the registered asynchronous callback function.

12. The computer system of claim 11, wherein the database column is written to, for each of the plurality of applications, using a write function having parameters including row key, column key, and ref key specifying a cell, and a parameter value specifying a value for the cell.

13. The computer system of claim 12, wherein the write function is append-only, such that the value is appended to the cell without changing existing values of the cell.

14. The computer system of claim 12, wherein an instance of a first application uses a first schema for a write to a cell of the database, and an instance of a second application uses a second schema for a write to a cell of the database, the first schema being different from the second schema.

15. The computer system of claim 11, wherein the server system defines a trigger handler registration API defining a registration function for registering the asynchronous callback function, the registration function being a decorator function wrapping the asynchronous callback function.

* * * * *

UNITED STATES PATENT AND TRADEMARK OFFICE
CERTIFICATE OF CORRECTION

| | | |
|---|---|---|
| PATENT NO. | : 11,132,382 B2 | |
| APPLICATION NO. | : 16/526663 | |
| DATED | : September 28, 2021 | |
| INVENTOR(S) | : Schmidt et al. | |

It is certified that error appears in the above-identified patent and that said Letters Patent is hereby corrected as shown below:

In the Claims

In Column 14, in Claim 12, Line 17, delete "computer" and insert -- server --, therefor.

In Column 14, in Claim 13, Line 22, delete "computer" and insert -- server --, therefor.

In Column 14, in Claim 14, Line 26, delete "computer" and insert -- server --, therefor.

In Column 14, in Claim 15, Line 31, delete "computer" and insert -- server --, therefor.

Signed and Sealed this
Fourteenth Day of June, 2022

*Katherine Kelly Vidal*

Katherine Kelly Vidal
*Director of the United States Patent and Trademark Office*